April 19, 1960
M. C. SELBY ET AL
2,933,684
ATTENUATOR-THERMOELECTRIC HIGH-FREQUENCY VOLTMETER
Filed Dec. 5, 1956
2 Sheets-Sheet 1
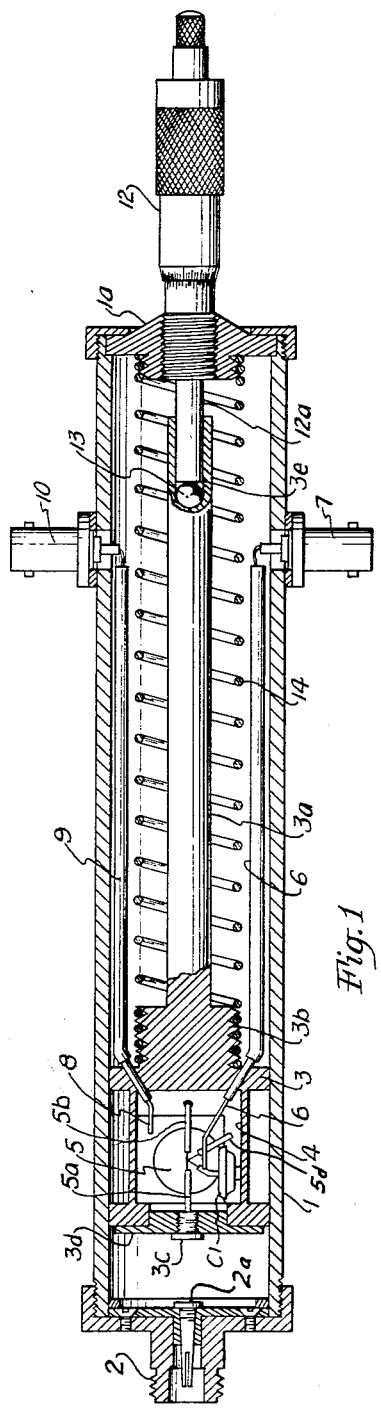
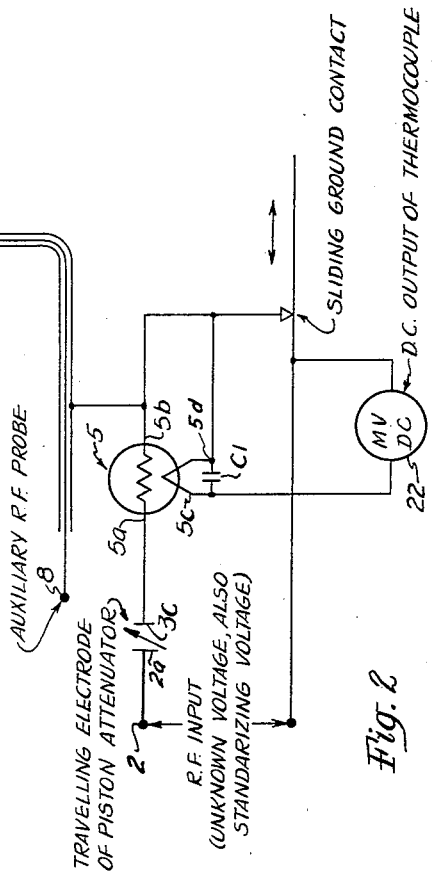
INVENTORS
Myron C. Selby
Lewis F. Behrent
BY Arthur Vinograd
Leonard F. Stoll
ATTORNEY
AGENT April 19, 1960
M. C. SELBY ET AL
2,933,684
ATTENUATOR-THERMOELECTRIC HIGH-FREQUENCY VOLTMETER
Filed Dec. 5, 1956
2 Sheets-Sheet 2
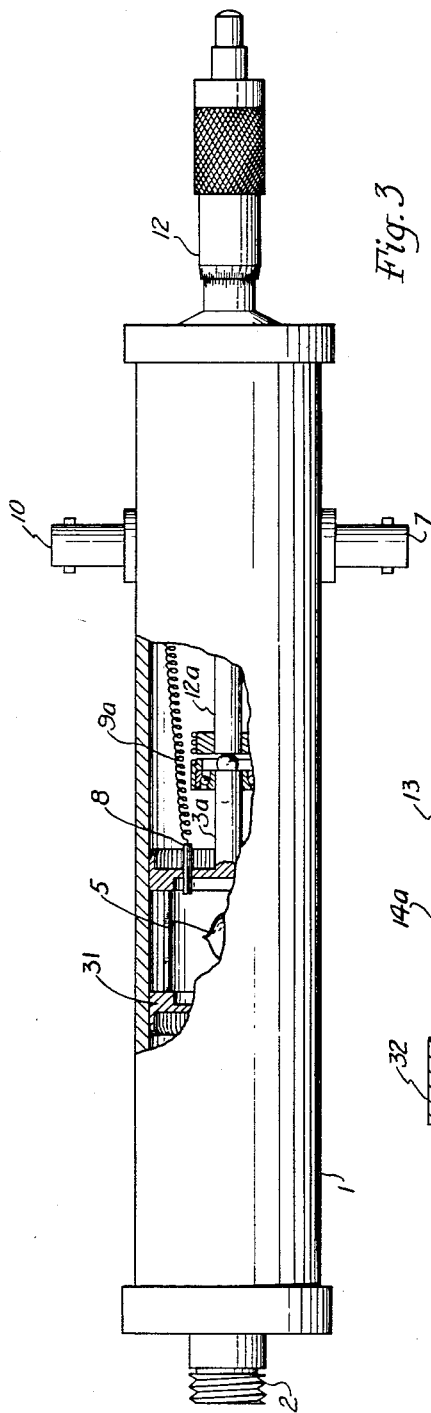
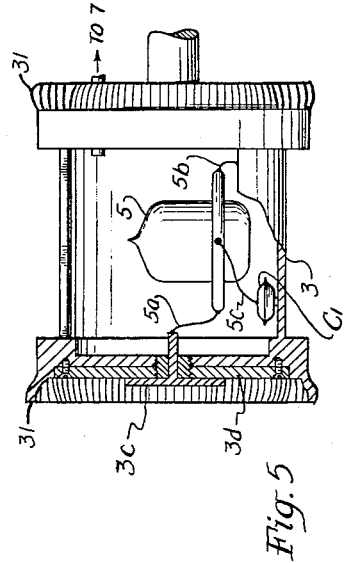
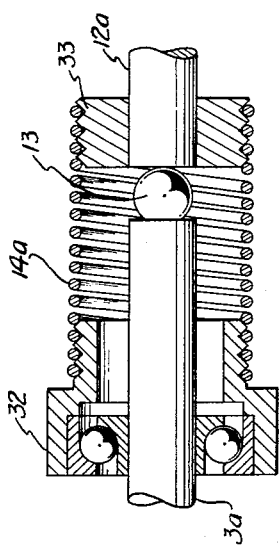
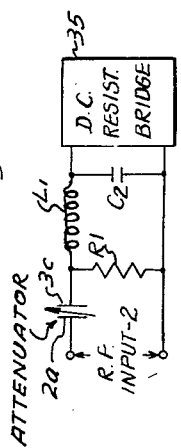
INVENTORS
Myron C. Selby
Lewis F. Behrent
BY Arthur Vinograd
Leonard F. Stoll ATTORNEY
AGENT United States Patent Office 2,933,684
Patented Apr. 19, 1960

2,933,684

ATTENUATOR-THERMOELECTRIC HIGH-FREQUENCY VOLTMETER

Myron C. Selby and Lewis F. Behrent, Boulder, Colo., assignors to the United States of America as represented by the Secretary of Commerce Application December 5, 1956, Serial No. 626,559

7 Claims. (Cl. 324—95)

This invention relates to high-frequency measurements and particularly contempaltes a novel attenuator-thermoelectric, R-F voltmeter for measuring radio frequency voltages to relatively high amplitudes and to very high frequencies.

Existing voltmeters, employing thermionic elements or crystal diodes, while capable of covering such measurement range have the disadvantage of not maintaining calibration for a reasonable length of time. The degree of uncertainty in known types of voltmeters is of the order of 10% and may be frequently as high as 20%. The present invention has been found to have a calibration stability well within the accuracy of the original calibration (of the order of one percent) for a period of one year or longer.

It is accordingly an immediate object of this invention to provide a highly stable voltmeter for use in high-frequency applications which will maintain its calibration for relatively long-time periods.

Another object of this invention is to provide a voltmeter for use in high-frequency applications which need be calibrated at only one voltage level for a given frequency and which will then accurately measure all voltages within the instrument range at that frequency.

A further object of this invention is to provide a voltmeter which is relatively simple in construction and economical.

An additional object of this invention is to provide a voltmeter which is suitable for use as a secondary reference standard in applications requiring voltage accuracies of better than 10%.

Still another object of this invention is to provide a true waveguide type of voltmeter in which capacitive coupling between the energy source to be measured and the transducer is not critical.

A still further object of this invention is the provision of a voltmeter of the type described having self-contained calibrating means.

Still another object of this invention is to provide a stable voltmeter which operates within a frequency and voltage range in which existing voltage measuring techniques and devices are either unsatisfactory or nonexisting, specifically at voltage levels of 50 volts and higher and at frequencies of approximately 500 mc. and higher.

Other uses and advantages of the invention will become apparent upon reference to the specification and drawings in which:

Fig. 1 is a side elevation, partly in section, showing one modification of the attenuator-thermoelement voltmeter of the present invention;

Fig. 2 is a schematic diagram showing the electrical circuitry involved in the invention;

Fig. 3 is a view similar to Fig. 1 showing a modified form of the invention;

Fig. 4 is an enlarged view of the modified shaft coupling employed in the embodiment of Fig. 3;

Fig. 5 is an enlarged view showing the construction of one form of piston employed, and Fig. 6 is a circuit diagram of a modified R-F voltmeter according to this invention employing a bolometric type of transducer.

In accordance with the principles of the present invention, an R-F voltmeter is provided comprising a continuously adjustable waveguide-below-cutoff or piston attenuator, and a transducer such as a thermoelement or bolometer mounted in the piston attenuator. The effect of R-F power on a particular characteristic of the transducers is then utilized to produce an output manifestation.

The traveling piston houses the thermoelement or bolometer together with a built-in auxiliary R-F probe. The probe is employed to calibrate the voltmeter by means of an auxiliary primary standard bolometer bridge with 1 volt or lower voltage levels at all frequencies. Only one voltage level needs to be calibrated at a given frequency in accordance with the instrument of this invention; all other voltages at such frequency within the range of the instrument will be accurately defined because of the high degree of stability inherent in the instrument.

One serious deficiency characterizing existing R-F voltmeters is that calibration must be performed at all frequencies and at a multiplicity of voltage levels covering the range of the particular instrument because there is no definitely established law relating relative voltage magnitudes with voltmeter indications. By contrast, when a waveguide attenuator is employed as in the instrument of the present invention, the law relating voltage amplitudes to meter indications is established and may be expressed mathematically. Specifically, as is well known, the variations of input (R-F) voltage with piston position follows a definite logarithmic relationship. For a given frequency therefore, the instrument of the present invention need be calibrated for only one voltage level.

Fig. 1 shows one embodiment of the attenuator-thermoelectric voltmeter embodying the principles of the present invention. The voltmeter consists of a continuously adjustable capacitive and waveguide-below-cutoff piston attenuator which carries a stable, essentially insensitive to frequency transducer such as a thermoelement or bolometer which monitors the attenuator output by means of a D.-C. millivoltmeter, ohmeter or resistance bridge.

The waveguide 1 shown in Fig. 1 is of conventional construction and is terminated at one end by a coaxial connector 2 also of conventional construction. A movable piston 3 is slidably mounted within the waveguide, as indicated. The piston 3 includes a shouldered recess 4 in which the transducer which may be in the form of thermoelement or bolometer generally designated as 5 is located. An R-F bypass capacitor C1 is provided within the recess 4 and is included in the circuit to be described in connection with Fig. 2. An output lead 6 connects one of the two D.C. output terminals of the transducer to a connector 7 to which a manifesting device may be connected. The other D.C. output lead, 5d Fig. 1, is connected to ground through the piston. An auxiliary R-F probe 8 is also mounted within the recess 4 and is connected by a flexible lead 9 to a second terminal connector 10. The leads for both the probe and transducer output are sufficiently flexible to permit free movement of the piston in an axial direction along waveguide 1.

Controlled movement of the piston 3 is obtained in accordance with the embodiment of Fig. 1 by a micrometer control 12 which includes a stub shaft 12a projecting into the interior of waveguide 1. The piston 3 is provided with a piston rod 3a having a hollow recess 3e at one end for accommodating the micrometer stub shaft 12a. An antifriction member in the form of a ball bearing 13 is inserted in the bottom of the recess 3e for receiving the thrust exerted by shaft 12a when the piston is displaced to the left as viewed in Fig. 1. A helical spring 14 is mounted within waveguide 1 concentrically with piston rod 3a. One end of the spring is anchored to a threaded shoulder 3b provided on the piston while the opposite end of the spring is secured to an end flange 1a on the waveguide.

The spring 14 serves two purposes. It provides for retractive movement of piston 3 when micrometer control 12 is rotated in a direction opposite to that which causes displacement of the piston to the left as viewed in Fig. 1. It also prevents rotational movement of the piston consequent to any torque which may be transmitted through ball bearing 13.

Fig. 2 is a circuit diagram showing the electrical connections employed in the embodiment of the invention employing a thermoelement as the transducer. A typical thermoelement such as is employed as the transducer in connection with such embodiment may be a VHF type manufactured by Best Products Lmtd. and includes thermocouple terminals such as 5c, 5d and heater terminals 5a, 5b.

One of the heater terminals 5b and a thermocouple terminal 5d are connected directly to the piston as by soldering or other suitable means as indicated in Fig. 1. Since the piston is made of electrically conducting material, such leads will be connected to ground as indicated by the connection labeled "sliding ground contact" in Fig. 2. The other thermocouple lead 5c, suitably bypassed by capacitor C1, inside the piston, is connected to an indicator such as a D.C. millivoltmeter 22, through the flexible lead 6 and connector 7 shown in Fig. 1.

The other of the heater terminals 5a, of the thermoelement 5, is connected to an electrically conducting member 3c secured to one face of the piston 3 by means of insulator disc 3d (see Fig. 1).

The auxiliary R-F probe 8 (Fig. 1) is employed for calibration purposes in the manner schematically shown in Fig. 2. As shown in this figure, a detector 21 may be connected to the R-F probe by means of connector 10 (Fig. 1).

The auxiliary probe is employed to calibrate the attenuator-thermoelectric voltmeter comprising the present invention in terms of some primary standard such as a standard bolometer bridge. For example, a bridge having an output of approximately 1 volt may be employed for calibration. The attenuator-thermoelectric voltmeter has an inherently high insertion loss such that it is necessary to apply for example more than 300 R-F volts to input terminal 2 at 5 mc. to obtain a sufficiently large manifestation from the thermoelement. At 900 mc., on the other hand, a 1 volt input is sufficient. The auxiliary probe 8 in combination with an R-F receiver such as monitor 21, enables the voltmeter of this invention to be calibrated with voltage of 1 volt or less at all frequencies. When a standardized R-F calibrating voltage is applied to the input of the attenuator-thermoelectric voltmeter, the indication of receiver 21 is noted corresponding to a minimum setting of the attenuator. The calibrating voltage is then increased in amplitude to any given value corresponding to a particular scale reading on the millivoltmeter 22. Attenuation of the voltmeter is then increased to reproduce the original indication on receiver 21. Noting such change in attenuation and the amplitude of the calibrating voltage, the magnitude of the voltage applied to the attenuator-thermoelectric voltmeter can readily be computed. Moreover, it is only necessary to calibrate at one voltage level for a particular frequency; all other voltage levels at such frequency within the range of the instrument being accurately determined in such manner.

The D.-C. millivoltmeter 22 is connected across the output or thermocouple terminals of the thermoelement 5 as described. The R-F signal to be measured, or, in the case of calibration, the standardizing R-F signal, is applied to the waveguide 1 by means of input connector 2. The center conductor of the connector 2 comprises the input electrode 2a which may have the form of a disc cylinder, cone, frustum, or other suitable configuration which is most efficacious for maximum voltage and frequency ranges.

In this manner the heating effect of the R-F power applied at input terminal is manifested as an electric signal which is registered on the meter 22. Once calibrated, only the meter 22 is necessary to indicate the voltage level of the measured signal.

Fig. 5 shows in greater detail the mechanical construction of the piston 3 which may be employed in the construction shown in both Figs. 1 and 3.

As shown in Fig. 5, the transducer 5 which is diagrammatically shown in Fig. 1 is mounted within the cavity 4 of the piston by means of its connector leads as shown. The piston 3 is generally cylindrical in shape as shown, a portion of the cylindrical wall being cut away to provide access to the interior recess 4.

Each end of the piston in the modification of Fig. 3 is machined and serrated as indicated at 31 (see Fig. 5) to provide a resilient, slidable, electrical connection between the piston and the interior wall of the waveguide 1; suitable prefabricated spring fingers may be mounted at the ends of the piston instead of the serrations. One end wall of the piston is recessed to provide a pocket for a disc 3d of dielectric material which is suitably fastened in place as indicated. The referred-to conducting member 3c may be in the form of a disc, cylinder, cone, frustum etc., corresponding to the input electrode 2a and is mounted at the center of the referred-to end wall. The shank portion of such member traverses the end wall of the piston to provide a connecting terminal for the connecting lead 5a of the heater of the thermoelement 5 according to one modification. The other terminal 5b of the heater is soldered to a shoulder provided in the recess of piston 3 as shown in Fig. 5. One of the thermocouple terminals 5c is soldered to the capacitor C1 anchored to the piston.

The thermoelement 5 employed may be of any desired capacity commensurate with the range of the apparatus. While 5 and 10 ma. thermoelements are convenient, other sizes, at a given frequency and electrode separation, affect only the relative input voltage levels required to reproduce the same output of the couple in the manner summarized in the following table.

| Thermoelement Current Rating, 1 ma. | Relative input voltage levels into voltmeter at one frequency and one piston position to reproduce a given couple output |
|---|---|
| 1.25 | 2.0 |
| 5 | 0.5 |
| 25 | 0.25 |
| 100 | 0.15 |

It is to be understood that the particular type of thermoelement, as above described, is exemplary and any other stable type of thermoelement or bolometer, such as a thermistor or barretter, can be employed with equal facility. When a bolometric type of transducer is employed, there is no change in the structural features of the instrument, the use of a bolometric component necessitating only a slight change in the character of the utilization circuit employed as shown in Fig. 6.

When a bolometric transducer is employed, the power of the applied R-F signal is dissipated in the form of heat which produces a resistive change in the bolometer as is well known. In Fig. 6 the resistive component of the bolometric device is indicated as R1. The bolometer represented by R1 is connected as shown to a D.-C. resistance bridge 35 which may be of a conventional type such as is described on page 85 of "Technique of Microwave Measurements," Radiation Laboratory Series, McGraw-Hill Company, New York. An inductance L1 and bypass capacitor C2 is included as shown. The bridge in measuring the change in the resistance of the bolometric device can readily be calibrated in terms of R-F input voltages.

Fig. 3 shows a slightly modified embodiment of the invention employing a unitary resilient coupling between the micrometer control shaft 12 and the piston shaft. The coupling member shown enlarged in Fig. 4 comprises a ball bearing assembly 32 mounted on the piston rod 3a and an anchoring shoulder fixed to the end of the micrometer shaft 12a. The helical spring 14a in the modification of Fig. 3 is anchored respectively to the ball bearing assembly 32 and the anchoring shoulder 33 to provide a resilient coupling therebetween. A ball bearing 13 is provided between the approximate ends of the micrometer shaft 12 and the piston rod 3a, respectively. The end of the piston rod is suitably recessed to provide a seat for the ball bearing. The helical spring 14a is initially biased to provide sufficient contact between the piston rod 3a and the micrometer shaft 12a to retain the ball bearing 13 in place. Actuation of the micrometer control 12 in a direction to displace piston 3 to the left as viewed in Fig. 3 permits the piston 3 to be displaced without imparting rotational movement thereto because of the ball bearings 32 and 13. Fig. 3 further shows a modified type of connecting lead 9a which can be employed between the transducer 5 and the connectors 10 and 7. A flexible, coiled conductor which may be stretched upon displacement of the piston 3 is employed, the conductor being self-restoring when the piston is displaced to the right as viewed in Fig. 3. The construction and operation of the instrument shown in Fig. 3 is otherwise similar to the embodiment described in connection with Fig. 1. The particular mechanical arrangement employed for controlling movement of the piston is exemplary and many mechanical arrangements for accomplishing the same result will be readily apparent to those skilled in the art.

It is important to emphasize that the adjustable position of piston 3 within the tube 1 provides a true waveguide attenuator. Specifically the side of the piston 3d facing the wave-receiving end 2 of the waveguide as employed in the apparatus of the present invention effectively operates at separations between the end of the waveguide and the face of the piston of from ¼ to 2 inches or greater. The described embodiment may be readily used with equal facility at separations smaller than ¼ of an inch, in which case the behavior of the attenuator will be similar to that of a capacitive type; the actual separation point at which the attenuator ceases to behave like a waveguide-below-cutoff type and will start to behave like a capacitive type will depend largely upon the shape of the electrodes used at 2a and 3c.

By virtue of such construction featuring the combination of a waveguide attenuator and of stable transducers, calibration stability of ±1% or better has been obtained for time periods of one year or longer.

The basic reason for the attainment of such high degree of stability is that the referred-to elements employed in the mechanism according to the present invention namely, the waveguide attenuator consisting of waveguide 1, input electrode 2a, and piston 3 and transducer 5, are inherently the most stable electrical components available to perform such functions for the frequency range contemplated.

The degree of stability obtained in accordance with the practice of this invention is considered significant when compared with known measuring systems for measuring R-F voltages. Existing instruments employing thermionic or nonthermionic rectifiers have a calibration stability approximately 10 to 20 times less than that of the attenuator-thermoelement combination, for example, according to this invention.

A great advantage resulting from the features employed in the present invention is the relative freedom from serious errors occasioned by the presence of harmonics. Since the thermoelement type of transducer employed in one embodiment of this invention, for example, is a true R.M.S. responder, the error introduced by a 10% harmonic for example, will not exceed 1% as compared to a 10% error as in conventional voltmeters.

As has been indicated in the above description, the present invention enables the applicability of thermistors as the transducing element 5. Thermistors are considered more practicable at frequencies above 1,000 or 2,000 mc.

The voltmeter according to the present invention has no practical limitations on amplitude nor on frequency and is satisfactory for the measurement of voltage amplitudes up to several hundred volts and at frequencies as high as 2,000 mc. Input impedance tests on the instrument indicate that it is comparable to vacuum-tube voltmeters, particularly at the higher voltage levels and at the higher frequencies.

It will be apparent that the embodiments shown are only exemplary and that various modifications can be made in construction and arrangement within the scope of invention as defined in the appended claims.

What is claimed is:

1. A high-frequency, R-F voltmeter comprising a waveguide-below-cutoff attenuator having an input terminal for the application of an R-F signal, an R-F output conducting member, a stable, frequency-insensitive transducer mounted in said output member means for adjustably mounting said output member in and in electrical contact with said waveguide for movement relative to said input terminal over distances within and in excess of that necessary for capacitive coupling therebetween and means electrically coupling said transducer to a voltage indicator.

2. The invention of claim 1 in which said R-F output conducting member comprises a piston having a portion slidably engaging and in electrical contact with said waveguide, said piston having a recess for receiving said transducer, said output conducting member being provided in the face of the piston proximate to said waveguide-below-cutoff attenuator input terminal and insulated from said piston, means electrically connecting one terminal of said transducer to said member and means electrically connecting said transducer to said piston.

3. The invention of claim 2 including an R-F probe mounted in said recess and means connecting said R-F probe to a voltage calibrating means.

4. The invention of claim 2 in which said piston is provided with an operating shaft and said adjustable mounting means comprising a micrometer control, and coupling means connecting said micrometer control to said shaft to provide nonrotational displacement of said piston longitudinally of said waveguide.

5. The invention of claim 1 in which said transducer comprises a bolometric device.

6. The invention of claim 5 in which said bolometric device is a thermistor.

7. The invention of claim 5 in which said bolometric device is a barretter.

References Cited in the file of this patent
UNITED STATES PATENTS

| | | |
|---|---|---|
| 2,411,553 | Ramo | Nov. 26, 1946 |
| 2,497,094 | Moreno | Feb. 14, 1950 |
| 2,557,110 | Jaynes | June 19, 1951 |
| 2,672,591 | Wallauschek | Mar. 16, 1954 |

FOREIGN PATENTS

| | | |
|---|---|---|
| 710,112 | Great Britain | June 9, 1954 |

OTHER REFERENCES

Wheeler: "The Piston Attenuator in a Waveguide Below Cutoff," Wheeler Monographs, No. 8, January 1949, Wheeler Laboratories, Inc., Great Neck, N.Y. (pages 30-33 relied upon).